Patented Feb. 3, 1942

2,271,620

UNITED STATES PATENT OFFICE 2,271,620

PROCESS OF PREPARING VEGETABLE PROTEIN COMPOSITIONS

John C. Brier, Ann Arbor, and Gerard W. Mulder, Kalamazoo, Mich., assignors to Welsh and Green Incorporated, Chicago, Ill., a corporation of Delaware No Drawing. Application February 19, 1940, Serial No. 319,692

14 Claims. (Cl. 134—23.8)

This invention relates to a process of preparing vegetable protein compositions for use in the sizing and coating of paper, for use as adhesives, as binders in cold water paints and for like purposes.

It has heretofore been proposed to prepare adhesive compositions by a rather complicated process involving the separation from a vegetable protein soluble in strong alkali, of a fraction insoluble in lime water. In the Cone et al., Patent No. 1,955,375, for instance, oleaginous seed material is subjected to the dissolving action of an aqueous solution of a weakly alkaline salt such as an alkali metal sulfite. Undissolved matter, which is also insoluble in lime water, is separated. Lime is added to the saline solution of protein, precipitating more lime insoluble matter, which is similarly removed. The strongly alkaline solution of lime soluble protein thus prepared is then held at a suitable temperature for a length of time sufficient to effect a drastic denaturation of the protein. After precipitation with acid at a pH of about 4.0 to 4.4, followed by drying, the resulting protein is readily redispersible in a weakly alkaline salt solution.

Optional alternative methods include an initial digestion of the protein with a strong solution of caustic soda followed by the addition of lime to remove lime insoluble matter, as well as a digestion with lime water to effect a separation of the protein fraction that is insoluble therein. These prior art processes may be generally characterized as comprising one step directed to the removal of a lime insoluble protein fraction and another step comprising a severe denaturation of the lime soluble protein to make the same readily redispersible from a dry state in a weakly alkaline salt solution. The separated lime insoluble fraction may be separately treated with strong caustic soda to yield an inferior adhesive composition.

We have now found that it is not necessary to separate the lime insoluble portion of the protein content of oleaginous seed material from the lime soluble major portion of the protein content. Instead, the protein content of the seed material can be treated in a simple manner, without separation of any lime insoluble fraction, to give a completely homogeneous dispersion of the entire protein content in an aqueous alkaline medium of a sufficiently low alkalinity and viscosity to render said dispersion suitable for use as a paper coating or sizing composition.

We have further found that after hydrolyzing the total protein content of vegetable seed material to a limited extent, insufficient to render said protein directly dispersible from a dry state in a weakly alkaline aqueous medium, such slightly hydrolyzed protein may be mediately dispersed in a weakly alkaline aqueous medium by first dispersing said protein in a strongly alkaline aqueous medium and then reducing the alkalinity to the desired extent. This reduction of alkalinity can be effected so as not to be accompanied by any precipitation of the dispersed protein other than possibly a temporary local precipitation that is quickly followed by a redispersion of the protein.

We have also found that a vegetable protein which has not undergone such drastic hydrolysis or chemical change as to be directly dispersible in a weakly alkaline medium from a dry state, exhibits adhesive properties strikingly superior to those displayed by a vegetable protein that has been so drastically hydrolyzed as to be readily dispersible from a dry state in a weakly alkaline aqueous medium. These superior adhesive qualities are particularly evident from a comparison between dispersions of the two types of protein in weakly alkaline aqueous media.

In accordance with our process, vegetable protein may be treated initially in an aqueous caustic alkali solution to effect, in one step, the desired degree of hydrolysis or chemical change in the protein and its simultaneous dispersion. The alkalinity of the aqueous medium is then reduced to obtain directly a homogeneous dispersion of the vegetable protein in an aqueous medium having an alkalinity so low as to be incapable of readily effecting the dispersion of the same protein directly from a dry state.

If desired the protein may be one that has been precipitated from an aqueous solution at some stage of its preparation by adjusting the pH value of the solution to a value approaching the isoelectric point of the protein. Thus precipitated protein, if it has been only slightly hydrolyzed previous to precipitation, is not readily redispersible in a weakly alkaline aqueous medium. The protein can, however, be first dispersed in a strongly alkaline aqueous medium and the alkalinity of the latter then reduced, in accordance with our invention, to yield a homogeneous dispersion in a weakly alkaline medium.

It is therefore an important object of this invention to provide a method of preparing vegetable protein compositions of improved adhesive quality, and in particular, a composition adapted for use in the sizing and coating of paper and other sheet or web material.

It is another important object of this invention to provide a relatively simple method for the preparation of a vegetable protein composition that utilizes substantially the entire protein content of the starting material and that avoids isolation of any fractions thereof.

Yet another important object of the present invention is to provide a method of preparing a vegetable protein adhesive composition that involves only a limited degree of hydrolysis or chemical change with no appreciable loss of adhesive qualities, rather than a severe hydrolysis with concomitant great loss of desirable adhesive properties.

A further object of the invention is to provide adhesive compositions which combine superior adhesive qualities with homogeneity, low alkalinity and low viscosity.

Another object of the present invention is to provide homogeneous dispersions of vegetable proteins in weakly alkaline aqueous media and to provide methods of preparing such dispersions including an initial dispersion of the protein in a strongly alkaline medium followed by a reduction of the alkalinity of the latter to make the resulting weakly alkaline dispersions suitable, particularly as to alkalinity, for use in the sizing and coating of paper and like fibrous web material.

Other and further important objects of this invention will become apparent from the following description and appended claims.

The source of the vegetable protein to be treated in accordance with the process of our invention may be oleaginous seed material, for instance soya bean, cotton seed, peanut, tung nut, castor bean, linseed and the like, or cereals and grains, including corn or maize. If oleaginous seed material is used, it is preferable first to remove, if necessary, any dark colored shell or hull by a suitable method of decortication, and then to remove, by extraction with a suitable solvent, such as hexane, or by any other means, the greater part of the oily matter present, whereby a product on the order of soya bean flour or meal is obtained.

Various chemical processes are available for removing the non-proteinogenous matter present in the substantially oil-free seed material. We prefer to accomplish this by a combination washing and steeping treatment of a high protein content meal residue obtained by the extraction of oil from any of the oleaginous seed materials constituting the source of the protein. The substantially oil-free seed meal residue is washed with acidulated water such that the pH of the resultant mixture is at all times approximately, although not necessarily exactly, at the isoelectric point of the major vegetable protein present. In the case of soya bean protein, this means maintaining the acidity of the wash water and resultant mixture between the broad limits of from a pH of 4 to a pH of 6, preferably around a pH of 5.0. Although the isoelectric point of the main protein, globulin, in the case of soya bean, is at a pH of about 4.4, only slight losses of this protein due to solubility occur when the pH of the mixture is allowed to go as high as 5.0, or even higher up to about 6.0.

A prolonged leaching of the defatted meal with acidulated water effects a swelling and softening of the meal, accompanied by a substantially complete extraction of the water soluble proteins, carbohydrates, hemicellulose and galactan. Various acids may be used to acidulate the wash water, including sulfurous, sulfuric, hydrochloric, citric, tartaric, lactic, malic, acetic, succinic, benzoic, and others. Sulfurous and hydrochloric acids are preferable because neither tends to cause discoloration of the meal and both are relatively cheap. Sulfurous acid particularly promotes the swelling of the metal. When hydrochloric acid is used, about 2.8% by weight of 20° Bé. acid is usually necessary to effect a suitable pH in the wash water.

The extraction of water soluble constituents is promoted by carrying out the treatment with acidulated water as a countercurrent leaching operation, or by the repeated decanting of the supernatant liquor and its replacement with fresh acidulated water. We have, for instance, successfully used four countercurrent washes using a total amount of water equal to about 25 times the weight of the protein meal being leached, or three successively replaced batches of acidulated water removed by decantation amounting to 40 times the weight of the meal.

The residue left after this treatment with acidulated water is the preferred starting material for our present process. The residue contains intercellular fiber, insoluble galactans and proteins. For uses of our final protein composition where the presence of intercellular fiber and insoluble galactans is not desirable, the residue may be further treated by wet burring, followed by screening. The effect of wet burring the seed meal residue is to string out the fiber and galactan present in long fibrils, whereas the protein agglomerates are released as more or less spherical particles. By wet screening the resulting mass, after burring, the protein particles, being spherical, pass through the screen, while fibers and galactanous materials are rejected and may be washed off the screen. In this manner it is possible to effect a good separation of proteinogenous from non-proteinogenous materials.

In both the washing, or leaching, and wet burring steps, the aqueous mass of seed meal residue is maintained at an acidity such as to keep the protein present in a non-sticky state. This is accomplished, as previously stated, by regulating the acidity of the aqueous mass between a pH of 4 and a pH of 6. It is thus possible to obtain a final protein product containing less than 1% of fibrous and insoluble galactanous material and in which the protein is in a relatively pure state, not significantly changed chemically from that in which it is present in the original seed material.

While the above described method of isolating a vegetable protein from seed material is our preferred one, it is nevertheless possible to extract the protein material from the seed meal residue by other ways, as by dissolving out the protein in either strongly alkaline or acid aqueous media, or by means of a salt solution. Although we do not exclude from our present invention the possibility of starting with a protein dissolved out of the seed meal residue in any of these various ways, we have found that much better qualities can be developed in the final protein composition if our method of washing or leaching out the protein from the seed meal residue, followed by wet burring and wet screening, is employed.

The vegetable protein to be treated in accordance with the process of the present invention may be referred to as a chemically isolated protein to distinguish the same from the original seed material or merely defatted seed meal or flour. Our process is not primarily intended for use with the latter type of material, although seed meal or flour may be employed as the starting material for some purposes.

Starting with a chemically isolated protein, and preferably a relatively pure protein prepared by the previously described steps of washing or leaching, wet burring and wet screening, the first step of our present process comprises dissolving the chemically isolated vegetable protein in a strongly alkaline aqueous medium. For this purpose, we find it preferable to use between about 7½ and 13 parts by weight of caustic soda, or its equivalent of another caustic alkali metal hydroxide, for each 100 parts of chemically isolated vegetable protein on an air dry protein basis (i. e. a protein containing 8% of moisture). On this basis as little as 7 parts and as much as 20 parts of caustic soda have, however, been found operative. We have determined that the least amount of caustic alkali that can be used effectively must be sufficient to impart to the mass an alkalinity equivalent to a pH of about 12. The larger proportions of caustic soda, although operative, are not only unnecessary but undesirable since any large excess of caustic soda requires the use of more acid in the subsequent step of reducing the alkalinity and thus brings about an undesirably high concentration of salt in the final product.

The concentration at which the protein is dispersed in the strongly alkaline aqueous medium is relatively unimportant, except that it should not be unnecessarily dilute since that would require subsequent evaporation to bring the dispersion within the limits of concentration required in sizing and coating operations. Preferably, an aqueous dispersion of this protein is made up that will contain between 10 and 16.5 per cent of air-dry protein by weight of the total aqueous dispersion, although as much as 20% has been treated successfully.

After the addition of the strongly alkaline aqueous caustic solution to the chemically isolated vegetable protein, the mass is either allowed to stand, with agitation, at ordinary room temperatures, or it is heated to a temperature preferably not over 140° F. for a sufficient length of time to effect a complete and homogeneous dispersion of the protein.

In the preparation of paper coating compositions from vegetable proteins, the extent to which the caustic alkali treatment is carried should be such as to effect a degree of hydrolysis or chemical change that will result in a dispersion having a viscosity of between 50 and 550 centipoises, suitably between 85 and 125 or 130 centipoises, for a dispersion containing 13% air dry protein.

The viscosity corresponding to equivalent degrees of hydrolysis at various concentrations of protein and various ratios of protein to alkali may be determined approximately by the following method. If a dispersion of known viscosity but unknown degree of hydrolysis contains more than 13 per cent protein, or has a protein-to-alkali ratio greater than 100 to 9, water or alkali is added to the dispersion so as to make the protein content and the protein-to-alkali ratio conform to that of the standard 13 per cent protein, 100 protein to 9 alkali dispersion, and the viscosity of the resulting composition is determined. If the degree of hydrolysis is unknown and the dispersion contains less than 13 per cent protein, the standard dispersion is diluted and its alkalinity adjusted to conform to the dispersion being investigated, and the viscosity of the resulting composition is determined at 25° C. with Garnder-Holdt viscosimiter tubes.

The caustic alkali treatment of the protein to render it dispersible may be interrupted by an intermediate precipitation of the protein with acidic agents, in which case a redispersion of the protein may thereafter be effected in a strongly alkaline medium. In other words, in the case of proteins that have been hydrolyzed to a more or less limited extent falling substantially short of the limiting value conferring immediate dispersibility from a dry state in a weakly alkaline medium, dispersion in such a medium may be effected by initially dispersing the protein in a strongly alkaline medium, followed by a reduction of the alkalinity of the latter to the desired value without loss of homogeneity. By a "weakly alkaline medium" is meant an alkaline solution having a pH less than 10.5.

The hydrolysis is preferably effected within a maximum time of from 2½ to 3 hours in order to avoid excessive discoloration of the protein. Too prolonged a treatment with strong caustic alkali, or the use of excessively high temperatures, such as over 140° F., is also to be avoided because involving the danger of carrying the hydrolysis too far, resulting in loss of adhesive strength in the finished product. Any caustic alkali treatment, however, that brings about a viscosity of the dispersion within the limits specified will, in general, be satisfactory.

Those skilled in the art will know how to balance the temperature, protein-to-alkali ratio, and like factors so as to effect the desired degree of hydrolysis or chemical change within a reasonable period of time. The following statements which are more specific than the above stated general principles will furnish additional guidance.

For operation at room temperature (22° C.), as little as 10 parts of caustic soda may be used for each 100 parts by weight of air-dry protein, in a solution containing 13% air-dry protein, to effect the desired hydrolysis within 5 to 6 hours. Less time is required when 12 parts of caustic soda are used, a viscosity of about 125 centipoises being reached in about 150 minutes and a viscosity of about 85 centipoises in about 250 minutes.

At a temperature of about 50° to 52° C. (120 to 130° F.) the time required is about 1 to 1⅓ hours when 9 parts of caustic soda are used, and about 2 hours when 8 parts of caustic soda are used.

At a temperature of 41° C. (106° F.) and using 11 parts of caustic soda, a viscosity of 165 centipoises may be attained in about 80 minutes, and a viscosity of from 85 to 105 centipoises in about 2 hours.

An extent of hydrolysis equivalent to that effected by 7½ to 13 parts by weight of caustic soda in about 650 parts of water for each 100 parts of vegetable protein for a period of from 120 to 15 minutes at about 100° F. has been found satisfactory for producing a high quality dispersion of soya bean protein.

The strongly alkaline aqueous protein dispersion obtained by the caustic alkali treatment above described will have an alkalinity that is much too high to permit its use directly in sizing and coating compositions. In the coating of paper, for instance, it is undesirable to use a protein coating composition having a pH appreciably above 10.0, with possibly 10.5 as a maximum. Preferably the alkalinity of the aqueous coating dispersion should be reduced to below a pH of 10, say, to a pH of between 9.0 and 9.8. While it is possible to reduce the pH to a value as low as 7.3, special conditions, such as those later described, must be observed to prevent precipitating out of the protein at such a low pH value.

The reduction in the alkalinity of the alkaline aqueous protein dispersion is effected by the addition to the dispersion of any acid or acidic substance effective to bring the alkalinity of the dispersion down to a pH of 10.5 or lower without bringing about a persistent precipitation or gelling of the protein. At the same time the acidic substance used should be capable of effecting the desired reduction in alkalinity without the necessity of using such large quantities of the acidic substance as to increase unduly the salt content of the dispersion.

A slight amount of local precipitation of protein during the acid addition is unimportant, but the protein should not be permanently or irreversibly precipitated out if its desirable qualities are to be developed to the highest degree. We have found it preferable to use a mixture of sulfur dioxide and carbon dioxide gases to effect the reduction in alkalinity when preparing compositions for sizing paper, since the reduction in alkalinity can then be effected, even to as low a pH as 7.3, without the exercise of too great care to prevent precipitation of the protein. The use of this gaseous mixture is further accompanied by only a very slight rise in the viscosity of the aqueous protein dispersion and does not tend to cause gelling even in the case of protein that has had a relatively mild caustic alkali treatment. The gaseous mixture should preferably contain less than 51% sulfur dioxide, say, about 5 to 40%, the balance being carbon dioxide. Such gaseous mixtures may be utilized to effect an alkalinity as low as that expressed by a pH value of 7.3 without persistent precipitation or gel formation, and without even effecting a very much greater viscosity. Furthermore, the use of gaseous acids, or mixtures of gaseous acid anhydrides effects a reduction in alkalinity without any appreciable dilution of the protein concentration in the dispersion.

In connection with the use of other acids we have found that a very slightly alkali-hydrolyzed protein is more likely to be precipitated out, tends to assume a higher viscosity on reduction of alkalinity and is more given to gelling on standing than more severely hydrolyzed protein. Each acid has a specific effect as to precipitation, raising of viscosity and formation of gels.

In the case of a protein dispersion prepared from 450 parts of chemically isolated soya bean protein, 382.5 parts of 10 per cent caustic soda solution and 2,628 parts of water by heating at 51° C. for 70 minutes to effect a final viscosity of 100 centipoises, which thereafter falls to 85 on standing: hydrobromic, hydrochloric, propionic, lactic, sulfuric, nitric and dry anthranilic, citric, boric, benzoic and salicylic acids, as well as sodium acid phosphate and phenol, when used to reduce the alkalinity of the protein dispersion to a pH value of between 10.5 and 8.6 do not cause persistent precipitation or gelling and do not greatly increase the viscosity. The use of hydriodic, normal butyric, monochlor acetic, succinic and oxalic acids is accompanied by more or less persistent local precipitation of protein. Perchloric, phthalic, lauric, palmitic and picric acids either cause a persistent precipitation or high viscosity even at pH values about 10.0. Oleic acid effects a good dispersion coupled with a great increase in viscosity at pH values as low as 8.6. Dry adipic acid causes gel formation.

In the case of a composition comprising 14.5 per cent of protein hydrolyzed with 8.5 parts of sodium hydroxide for each 100 parts of protein for 89 minutes at 51° C. to effect a viscosity of 320 centipoises and thereafter diluted with water to effect a protein concentration of 13 per cent and a viscosity of 165 centipoises, the reduction of the alkalinity to a pH value of between 9.0 and 10.0 by the use of hydrobromic, propionic, citric, dry boric and benzoic acids, as well as phenol and sodium acid phosphate is accompanied by great increases in viscosity. The use of lactic, sulfuric, nitric, hydrochloric and anthranilic acids causes gel formation.

In the case of a composition comprising 14.5 per cent of protein hydrolyzed with 8.5 parts of sodium hydroxide per each 100 parts of protein for 85 minutes at 52° C. to effect a viscosity of 225 centipoises and thereafter diluted with water, and/or acid solution, to a protein concentration of 13 per cent and a viscosity of 105 centipoises, reduction of alkalinity by the use of sodium acid phosphate is accompanied by gel formation. The use of hydrobromic, lactic, sulfuric, hydrochloric, nitric, orthophosphoric and dry citric acids to effect pH values between 9.0 and 10.0 causes pronounced increases in viscosity.

In the case of a 13 per cent protein dispersion hydrolyzed with 8.5 parts of sodium hydroxide per each 100 parts of protein for 75 minutes at 51.8° C. to a viscosity of 105 centipoises, carbon dioxide gas, mixtures of hydrogen chloride and carbon dioxide gases, or a gaseous mixture of acetic acid and carbon dioxide gas, as well as dry sodium bicarbonate, all cause gel formation within 12 hours even at final pH values as high as 10.0. Sulfur dioxide gas causes increased viscosity without effecting the formation of a persistent solid phase even at final pH values as low as 7.2.

Besides mixtures of sulfur dioxide and carbon dioxide gases, which are satisfactory at all degrees of hydrolysis to effect even a low alkalinity, hydrobromic, propionic, citric, boric, and benzoic acids and phenol are generally operative in the case of all except the least hydrolyzed proteins to bring about all but the lowest degrees of alkalinity, the lower limit below which a persistent solid phase is formed being a pH value of about 8.0. Other acids such as hydrochloric and nitric acids may be used to lower the pH value to about 9.0.

While the use of a mixture of carbon dioxide and sulfur dioxide gases is preferable for the preparation of paper coating compositions, because of not materially changing the viscosity of the dispersions, the use of other acidic agents effecting increased viscosities unaccompanied by persistent precipitation or gel formation may be advantageous for other purposes.

It will thus be seen that for a given protein the final viscosity of our novel adhesive compositions depends on the extent of alkaline hydrolysis of the dispersed protein, on the nature of the acidic substance used to reduce the alkalinity of the initially strongly alkaline medium in which the potein is dispersed, and on the pH value to which the alkalinity is reduced. A judicious balancing of these and other factors such as protein concentration will enable those skilled in the art to prepare adhesive compositions combining the superior qualities associated with a limited degree of hydrolysis and whatever viscosity, high or low, that may be desired for any given purpose.

In the preparation of the strongly alkaline protein dispersion and the reduction of its alkalinity to a pH below 10.5, it is preferable not to incorporate into the protein dispersion any chemical that will tend to insolubilize the protein, or to prevent the complete dispersion of all the protein used as the starting material. It is therefore not desirable to use calcium hydroxide, or lime, in bringing about the caustic alkali dispersion, nor to add formaldehyde, or other quickly acting methylene hardening agent, chromate salts or the like, to the aqueous protein dispersion. By avoiding the addition of any such chemicals, we are able to disperse all of the original protein and retain it in homogeneous aqueous dispersion right up to the point of its use as a coating or sizing composition.

Dark colored protein dispersions may be bleached with peroxides. Usually 100 grams of sodium peroxide or equivalent amounts of barium or hydrogen peroxide suffice to bleach 25 pounds protein dispersed in a concentration of 13 per cent. The peroxides may be added prior to, during, or after the reduction of the alkalinity by the addition of acid substances.

The following examples will serve to illustrate preferred embodiments of the principles of our invention, although it will be understood that these examples are in no way intended to limit the scope of our invention. Parts are given as parts by weight, the same as throughout this specification, except where specifically stated otherwise.

Example I

The chemically isolated vegetable protein used in this example was one that had been derived by solvent extraction of comminuted grade #2 hull-free soya beans. The resulting meal was placed in acidulated water whose acidity was maintained at a pH ranging from 4.4 to 4.6 by conducting sulfur dioxide gas into the solution. Carbohydrates and proteins soluble in the acidulated water were effectively separated from the insoluble protein of the meal by a series of five decantations. The last decantation left a paste of insoluble material containing about 12 per cent solids. This paste was burr-milled in a stone burr mill to a degree of fineness such that most of the protein present could be wet screened through a 190 mesh screen. The burr mill used did not have sharp cutting edges and the fibrous and galactanous materials of the paste were rolled or strung out to form fibrils, while the protein agglomerates were released as round protein particles. In the screening operation the suspended protein particles passed through the screen while the fibrous and galactanous materials were retained by the screen. The screened protein suspension was collected. The protein was allowed to settle out, filtered and dried at 50° C., after which the dried material was ground to a fineness such as to be capable of passing through a 60 mesh screen.

Twenty-five parts (air-dry weight) of protein thus produced was suspended in 147¼ parts of distilled water. The suspension was agitated and its temperature raised to 50° C. A solution of two parts of chemically pure sodium hydroxide in 18 parts of water was added to the protein suspension to effect a dispersion of the protein. Shortly after the addition of the sodium hydroxide solution the viscosity of the resulting homogeneous dispersion rose to 550 centipoises. Hydrolysis caused the viscosity of the dispersion to drop, at first rapidly. With continued heating the rate of change of viscosity decreased. At the end of 70 minutes the viscosity of the still homogeneous dispersion was 90 centipoises and its pH was about 12.

At this point a gaseous mixture of about 60 per cent carbon dioxide and 40 per cent sulfur dioxide was passed into the dispersion under a pressure of about 8 pounds per square inch. The pH of the homogeneous dispersion dropped uniformly. After five minutes the pH amounted to 9.5. The current of gas was then interrupted and the still homogeneous dispersion was allowed to cool to room temperature. No changes in viscosity or homogeneity were noticeable.

Two clay slips were then prepared. The first "Satin HT Clay" slip consisted of 2800 parts air dry clay, 2510 parts of water and 3 parts of sodium silicate and contained 49.5 per cent B. D. (bone dry) solids. The second "Regular HT Clay" slip consisted of 3000 parts air dry clay, 2000 parts water, 3 parts sodium silicate and contained 56.5 per cent B. D. solids.

A tub of coating color was prepared using the two clay slips and the homogeneous soya bean protein dispersion, 54 parts of the first clay slip, 126 parts of the second clay slip, 117.5 parts of the protein dispersion, 0.2 part of an evener solution and 0.09 part of ultramarine blue being used.

The tub of color thus prepared was used to coat paper stock on a commercially used brush coating machine.

A second tub of color was prepared using the same color formula but substituting a high grade of milk casein for the soya bean protein. This color was used in the same machine to coat paper from the same roll of paper raw stock used with the first tub. All other coating conditions, that is, coating weight, rate of coating, and like factors, were kept as nearly as possible identical with the conditions used in coating with the first tub of color.

Coated paper from each of the above mill runs was calendered to the same degree of finish, trimmed and subjected to laboratory examination. The paper coated with the color comprising the soya bean protein as the adhesive was found to be superior in adhesive strength and was sized harder than the paper coated with the color comprising the casein adhesive.

Example II

A strongly alkaline dispersion of soya bean protein was prepared as in Example I. To this dispersion 0.187 part of sodium peroxide (0.75 per cent by weight of the protein) was added and the alkalinity of the dispersion was reduced with mixed carbon dioxide and sulfur dioxide gases as described in Example I. The resulting homogeneous protein dispersion was light yellow in color, in contrast to the dark brown color of the dispersion of Example I.

A mill trial run under conditions identical with those of Example I yielded a coated sheet having greater brightness than that produced in Example I. The sheet of Example II was fully equal to that of Example I as to adhesive strength and ink resisting properties.

Example III

The chemically isolated vegetable protein used in this example was one that had been derived from soya bean by solvent extraction of grade #2 hull-free soya bean, followed by extraction of carbohydrates and soluble proteins with a slightly acid aqueous medium having a pH of 4.7, thereafter passing the protein residue through a burr mill and wet screening to remove the bulk of cellulosic and fibrous material. The thus obtained chemically isolated protein, which may or may not have been dried at a relatively low temperature, constituted the starting material of this example.

One hundred parts of the thus isolated vegetable protein, still containing about 8% of moisture, were mixed with 566 parts of water and 100 parts of a 10% aqueous solution of caustic soda. The resulting mass was then heated to a temperature of 100° F., and held at that temperature for 80 minutes to effect complete dispersion of the protein. A mixture of carbon dioxide and sulfur dioxide gases was then blown into the strongly alkaline aqueous dispersion to reduce the alkalinity to a pH of 9.75. The mixture of gases contained not more than 50% $SO_2$ and preferably from 5 to 15% of $SO_2$, the balance being $CO_2$.

During the passage of the mixed gases through the aqueous dispersion, the heating was discontinued, so that the dispersion might cool down to ordinary room temperatures by simple loss of heat. At the end of the alkalinity reduction step, the viscosity of the resulting aqueous dispersion at a temperature of 77° F., was between 85 and 100 centipoises.

The aqueous protein dispersion was then ready to be made up into a paper coating composition, or to be used for any of the purposes for which it is adapted. In the case of a coating composition, 92 parts of the homogeneous aqueous dispersion prepared as above were added to a clay slip, made by working up 75 parts of clay and 45 parts of water into a homogeneous paste. The resulting mixture was then ball-milled for 15 minutes to give a coating composition having a viscosity of 250 centipoises at 77° F., a pH of 9.5 and a proportion of clay, protein and water in the ratio of 100 to 14.7 to 200. Upon employing this composition to coat raw paper stock with a coating that was 0.0011 inch thick, the coating gave a pick test of 7, when tested at 70° F. and 50% relative humidity.

Example IV

The chemically isolated vegetable protein used as the starting material in this example was obtained in a manner similar to that described under Example III, but the wet screening operation was omitted. For this reason the chemically isolated vegetable protein contained substantially greater amounts of non-proteinogenous material than that used in Example III and this made it necessary to use a proportionately greater amount of this material in the coating composition, in relation to the clay and water employed. The increase necessary in cases of this type may amount to 20%.

One hundred parts of the chemically isolated vegetable protein, 560 parts of water and 100 parts of a 10% aqueous solution of caustic soda were mixed together and the resulting mixture heated for 30 minutes at 100° F. Carbon dioxide gas was then blown through the mixture until its pH had been reduced to 10. In making the foregoing aqueous protein dispersion up into a coating composition, 110 parts of the homogeneous aqueous dispersion were added to a clay slip, prepared by working up 75 parts of clay and 45 parts of water into a homogeneous paste. A coating composition thus produced had a pH of 9.88 and contained clay, protein and water in the ratio of 100 to 17.5 to 200. The viscosity of this coating composition was 255 centipoises at 77° F. Upon coating raw paper stock therewith to give a coating that was 0.0011 inch thick, it was found to give a pick test of 7, when tested under conditions of 70° F. and 50% relative humidity.

Example V

The starting protein used in this example was a commercially treated vegetable protein which had been made by a selective solution of the protein content of soya bean flour in an alkaline aqueous medium, followed by precipitation of the protein from the solution so obtained, filtration and drying.

One hundred parts of the thus chemically isolated vegetable protein, 566 parts of water and 90 parts of a 10% aqueous solution of caustic soda were mixed together and the resulting dispersion allowed to stand for 5½ hours at room temperature. At the end of this period a complete dispersion of the protein was observed. Dilute hydrochloric acid, of 10% strength or less, was then added to the dispersion, care being taken to add the acid slowly with agitation to avoid undue precipitation of the protein locally, until the alkalinity of the dispersion had been reduced to 9.75.

The resulting homogeneous aqueous dispersion was employed to make up an excellent tub-size for paper.

Homogeneous dispersions of vegetable protein prepared as disclosed hereinabove, as a 13% protein solution, having a viscosity between 85 and 125 centipoises and a pH value ranging from about 7.3 to 10.5 and when utilized as the adhesive in a paper coating composition composed of 15 parts by weight of protein on an air-dry basis, 100 parts by weight air-dry H. T. coating clay and 160 to 200 parts by weight of water, and applied as a 15 to 20 pound coat on a number 4 book paper will yield coatings which when tested by the Dennison wax test at 50% relative humidity and 70° F. have a pick consistently in the neighborhood of 6 to 6.5. Dispersions of protein hydrolyzed only to viscosities of from 125 to 250 centipoises in a 13% protein solution or its equivalent in other concentrations, yield equally high pick tests by the Dennison wax test but are not as suitable for paper coating use, as more water must be added to the coating color to bring the viscosity of a coating color using this high viscosity protein dispersion down to a viscosity suitable for successful commercial paper coating.

Paper coating mills prefer to use as little water as possible in a coating color and add only sufficient water to give the color a uniform flow when applied to the paper raw stock; the viscosity of a desirable coating color is about 200 centipoises. When the hydrolysis is more severe than that equivalent to 85 centipoises in a 13% protein solution the desirable adhesive properties of the protein are rapidly lost.

These illustrative examples and the hereinabove disclosed general principles of our invention show that our invention comprises, broadly speaking, the discovery that vegetable proteins, if not so drastically hydrolyzed as to be readily dispersible from a dry state in a weakly alkaline medium, are possessed of superior adhesive qualities as compared with vegetable proteins hydrolyzed to an extent such as to render them directly dispersible from a dry state in a weakly alkaline medium. Our invention further comprises a method of preparing a weakly alkaline dispersion of a vegetable protein, by initially dispersing the protein in a strongly alkaline aqueous medium, effecting any degree of hydrolysis necessary to give the desired viscosity in the final dispersion, and thereafter reducing the alkalinity of the dispersion by incorporating therewith an acidic substance which does not bring about a persistent precipitation or irreversible gelling of the dispersed protein, or which, in other words, is compatible with the dispersion.

In the claims, where a ratio or weight of protein is expressed, air-dry protein containing 8% of moisture is intended.

This is a continuation-in-part of application Serial No. 192,966, filed February 28, 1938.

As indicated hereinabove, various details of procedure and of composition may be varied through a wide range without departing from the principles of this invention and it is, therefore, not our intention to limit the patent granted hereon otherwise than necessitated by the scope of the appended claims.

We claim as our invention:

1. The method of making an adhesive composition having an alkaline pH of 10 or less from a vegetable protein freed from a substantial proportion of the non-proteinogenous matter normally associated therewith, which comprises subjecting said protein to a hydrolyzing and dispersing action in an aqueous mass containing as an active ingredient an amount of caustic alkali sufficient to give a pH of at least 12, continuing such hydrolyzing and dispersing action under such conditions of time and temperature as to effect a homogeneous aqueous dispersion of said protein having a pH substantially above 10.5, and, without formation of a persistent gel, introducing into said aqueous dispersion an effective acid substance in sufficient quantity to reduce the pH thereof to an alkaline pH of about 10.5 or less without diminishing the homogeneity thereof.

2. The method of making an adhesive composition having an alkaline pH of 10.5 or less from a vegetable protein freed from a substantial proportion of the non-proteinogenous matter normally associated therewith, which comprises subjecting said protein to a hydrolyzing and dispersing action in an aqueous mass containing as an active ingredient an amount of caustic alkali sufficient to give a pH of at least 12, continuing such hydrolyzing and dispersing action under such conditions of time and temperature as to effect a homogeneous aqueous dispersion of said protein having a pH substantially above 10.5, and, without formation of a persistent gel, introducing into said aqueous dispersion $SO_2$ gas in sufficient quantity to reduce the pH thereof to an alkaline pH of about 10.5 or less without diminishing the homogeneity thereof.

3. The method of making an adhesive composition having an alkaline pH of 10.5 or less from a vegetable protein freed from a substantial proportion of the non-proteinogenous matter normally associated therewith, which comprises subjecting said protein to a hydrolyzing and dispersing action in an aqueous mass containing as an active ingredient an amount of caustic alkali sufficient to give a pH of at least 12, continuing such hydrolyzing action under such conditions of time and temperature as to effect a homogeneous aqueous dispersion of said protein having a pH substantially above 10.5, and, without formation of a persistent gel, introducing into said aqueous dispersion a mixture of $SO_2$ and $CO_2$ gases in sufficient quantity to reduce the pH thereof to an alkaline pH of about 10.5 or less without diminishing the homogeneity thereof.

4. The method of making an adhesive composition having an alkaline pH of 10 or less from a vegetable protein freed from a substantial proportion of the non-proteinogenous matter normally associated therewith, which comprises subjecting said protein to a hydrolyzing and dispersing action in an aqueous mass containing as an active ingredient an amount of caustic alkali sufficient to give a pH of at least 12, continuing such hydrolyzing and dispersing action under such conditions of time and temperature as to effect a homogeneous aqueous dispersion of said protein having a pH substantially above 10.5, and, without formation of a persistent gel, introducing into said aqueous dispersion hydrochloric acid in sufficient quantity and with sufficient care to reduce the pH thereof to an alkaline pH of about 10 or less without diminishing the homogeneity thereof.

5. The method of preparing an adhesive composition from vegetable protein, which comprises subjecting said protein in a concentration of between 10 and 20 per cent protein in an aqueous medium to the action of at least 7.5 per cent of caustic alkali by weight of said protein at such a temperature and for such a length of time as to produce a homogeneous aqueous dispersion of said protein having a pH of above 10.5 and a viscosity of between 50 and 550 centipoises when brought to a concentration of between 11 and 13 per cent protein by weight of the total mass, and without intermediate isolation of said protein or formation of a persistent gel, adding to said mass an amount of an effective acidic substance to reduce the alkalinity of said mass to a pH below 10.5 but above 7.3 and produce a relatively light colored, homogeneous aqueous dispersion having good adhesive qualities.

6. The method of preparing an adhesive which comprises subjecting a vegetable protein to the hydrolyzing and dispersing action of a caustic alkali aqueous medium having a pH value of at least 12, continuing such action for a sufficient time to effect a homogeneous dispersion of said protein and, without formation of a persistent gel, introducing into said dispersion an acidic substance compatible therewith in an amount effective to reduce the pH of the dispersion to a value less than 10.5.

7. The method of preparing an adhesive composition which comprises dispersing a vegetable protein in a caustic alkali aqueous medium having a pH value of at least 12, subjecting the thus dispersed protein to the hydrolyzing action of said alkali, and interrupting said hydrolysis before the adhesive qualities of said protein have been substantially impaired by incorporating with said dispersion, without formation of a persistent gel, an amount of a compatible acidic substance sufficient to reduce the alkalinity of said medium to a value of less than 10.5.

8. The process of preparing an adhesive substance from a vegetable protein, which comprises subjecting said protein to the action of caustic alkali in aqueous solution to an extent equivalent to that effected by 7.5 to 13 parts by weight of caustic soda for each 100 parts of vegetable protein for a period of 120 to 15 minutes at 100° F. to thereby form an alkaline aqueous dispersion of said protein having a pH substantially above 10.5, and introducing into said aqueous solution a mixture of $CO_2$ and $SO_2$ gas containing less than 51 per cent $SO_2$ to reduce the pH thereof to 10.5 or less while still retaining the homogeneity thereof.

9. The method of making an adhesive from soya bean protein substantially free from oleaginous and water soluble substances, which comprises mixing said protein with water and from about 7.5 to 13 per cent of caustic alkali by weight of said protein, heating the resulting mixture for from 120 to 15 minutes at 100° F. to effect a homogeneous alkaline dispersion of said protein and adding an effective acid substance to said dispersion to reduce the alkalinity thereof to an alkaline pH of about 10 or less without affecting the homogeneity thereof.

10. The method of making an adhesive from soya bean protein substantially free from oleaginous and water soluble substances, which comprises mixing said protein with water and from about 7.5 to 13 per cent of caustic alkali by weight of said protein, heating the resulting mixture for the equivalent of from 120 to 15 minutes at 100° F. to effect a homogeneous alkaline dispersion of said protein and introducing a sufficient quantity of a mixture of $SO_2$ and $CO_2$ gases into said dispersion to reduce the alkalinity thereof to a pH of about 10.5 or less without affecting the homogeneity thereof.

11. The method of making an adhesive composition from soya bean protein substantially free from the oleaginous and water soluble substances normally present in soya bean, which method comprises subjecting a mixture of said protein with about 7.5 to 13 per cent of caustic alkali by weight of said protein and water to the equivalent of a heating step at 100° F. for 120 to 15 minutes to form a homogeneous aqueous dispersion of said protein having a pH substantially above 10, and introducing an effective acid substance into said aqueous dispersion in sufficient quantity to reduce the pH thereof to an alkaline pH of about 10 or less without diminishing the homogeneity thereof.

12. The process of preparing an adhesive composition having an alkaline pH of 10 or less from a vegetable protein freed from a substantial proportion of the non-proteinogenous matter normally associated therewith, which comprises subjecting said protein to the hydrolyzing action of caustic alkali in a mass consisting of said protein, water, and caustic alkali in sufficient amount to give a pH substantially over 10, the extent to which said hydrolyzing action is carried being substantially that produced by heating 100 parts of said protein in about 650 parts of water with 7.5 to 13 parts of caustic soda for 120 to 15 minutes at 100° F., and as the next successive step adding to said mass a sufficient quantity of an effective acid substance to reduce the pH of said mass to an alkaline pH of 10 or less to form a freely mobile, homogeneous alkaline dispersion of said protein.

13. The method as defined in claim 1, wherein sodium peroxide is added to the dispersion to effect a bleaching thereof.

14. The method of making an adhesive from soya bean protein substantially free from oleaginous and water soluble substances which comprises mixing said protein with water and from about 7.5 to 13 per cent of caustic alkali by weight of said protein, heating the resulting mixture for about 70 minutes at about 50° C. to effect a homogeneous alkaline dispersion of said protein and introducing a sufficient quantity of a mixture of $SO_2$ and $CO_2$ gases into said dispersion to reduce the alkalinity thereof to a pH of about 10.5 or less without affecting the homogeneity thereof.

JOHN C. BRIER.
GERARD W. MULDER.